(12) United States Patent
Droke

(10) Patent No.: US 10,967,300 B2
(45) Date of Patent: Apr. 6, 2021

(54) TRANSPORTABLE SEPARATION AND MONITORING APPARATUS WITH AUGER

(71) Applicant: Green Flow Industries, LLC, Oklahoma City, OK (US)

(72) Inventor: David Droke, Elk City, OK (US)

(73) Assignee: Green Flow Industries, LLC, Oklahoma City, OK (US)

( * ) Notice: Subject to any disclaimer, the term of this patent is extended or adjusted under 35 U.S.C. 154(b) by 331 days.

(21) Appl. No.: 15/689,915

(22) Filed: Aug. 29, 2017

(65) Prior Publication Data
US 2019/0060794 A1 Feb. 28, 2019

(51) Int. Cl.
*B01D 21/00* (2006.01)
*B01D 21/24* (2006.01)
*B01D 19/00* (2006.01)

(52) U.S. Cl.
CPC .......... *B01D 21/003* (2013.01); *B01D 19/00* (2013.01); *B01D 21/0006* (2013.01); *B01D 21/0012* (2013.01); *B01D 21/2461* (2013.01); *B01D 21/2472* (2013.01); *B01D 2221/08* (2013.01)

(58) Field of Classification Search
None
See application file for complete search history.

(56) References Cited

U.S. PATENT DOCUMENTS

| | | | | |
|---|---|---|---|---|
| 2,276,075 A | * | 3/1942 | Wuensch | E21B 21/065 175/66 |
| 2,716,493 A | * | 8/1955 | Hutchison | B01D 35/28 210/389 |
| 2,756,965 A | * | 7/1956 | Howe | E21B 21/063 175/66 |
| 3,071,249 A | * | 1/1963 | Rains | B01D 29/82 210/128 |
| 3,544,369 A | * | 12/1970 | Keogh, Jr. | C11B 13/00 134/13 |
| 3,639,172 A | * | 2/1972 | Keogh, Jr. | B08B 3/042 134/13 |
| 3,777,405 A | * | 12/1973 | Crawford | F26B 3/08 34/591 |
| 3,865,727 A | * | 2/1975 | Broling | B01D 29/6476 210/162 |
| 3,920,552 A | * | 11/1975 | Elkern | B01F 5/0612 210/141 |

(Continued)

*Primary Examiner* — Robert J Popovics
(74) *Attorney, Agent, or Firm* — Hall Estill Law Firm

(57) ABSTRACT

A transportable separation apparatus for separating spent materials from oil and gas operations into a primarily solid component and a primarily liquid component. The separation apparatus includes a first separation area disposed on the separation apparatus for receiving spent materials and beginning separation of the spent materials. The separation apparatus designed to be connected to a vehicle to be pulled on commercial roadways. The separation apparatus also includes a second separation area in fluid communication with the first separation area for further separation of the spent materials. The separation apparatus can further include an auger in fluid communication with the first separation area to remove the primarily solid component from the separation apparatus. A method of introducing and separating the spent materials via the separation apparatus.

9 Claims, 5 Drawing Sheets

(56) References Cited

U.S. PATENT DOCUMENTS

| | | | | |
|---|---|---|---|---|
| 4,084,946 A * | 4/1978 | Burgess | B01D 19/0052 | 55/406 |
| 4,090,523 A * | 5/1978 | Kelly, Jr. | E21B 21/065 | 134/18 |
| 4,153,553 A * | 5/1979 | Davis | B01D 17/02 | 210/95 |
| 4,175,039 A * | 11/1979 | Fisher | B01D 21/0018 | 134/10 |
| 4,214,887 A * | 7/1980 | van Gelder | C02F 11/12 | 71/9 |
| 4,227,893 A * | 10/1980 | Shaddock | B60P 1/60 | 15/340.1 |
| 4,247,312 A * | 1/1981 | Thakur | B01D 21/00 | 96/159 |
| 4,274,963 A * | 6/1981 | Purvis | B01D 21/003 | 209/464 |
| 4,306,967 A * | 12/1981 | Trautwein | B01D 21/0012 | 210/167.31 |
| 4,366,063 A * | 12/1982 | O'Connor | B01D 17/02 | 166/267 |
| 4,377,475 A * | 3/1983 | Wiedemann | E03F 7/10 | 210/136 |
| 4,378,290 A * | 3/1983 | Kennedy, Jr. | B04C 9/00 | 210/103 |
| 4,389,314 A * | 6/1983 | Petretti | B01D 21/0012 | 210/241 |
| 4,396,504 A * | 8/1983 | Tannehill | B01D 33/0353 | 208/188 |
| 4,436,622 A * | 3/1984 | Petretti | B01D 29/03 | 210/232 |
| 4,459,207 A * | 7/1984 | Young | B01D 35/20 | 209/269 |
| 4,474,254 A * | 10/1984 | Etter | E21B 21/06 | 175/206 |
| 4,482,459 A * | 11/1984 | Shiver | B01D 36/00 | 210/639 |
| 4,507,208 A * | 3/1985 | Simon | B01D 36/00 | 210/721 |
| 4,543,183 A * | 9/1985 | Petretti | E03F 7/103 | 210/187 |
| 4,546,783 A * | 10/1985 | Lott | B01D 21/0018 | 134/109 |
| 4,595,422 A * | 6/1986 | Hill | B08B 3/042 | 134/105 |
| 4,597,437 A * | 7/1986 | McNabb | E21B 43/34 | 166/79.1 |
| 4,634,535 A * | 1/1987 | Lott | B01D 21/00 | 210/780 |
| 4,636,308 A * | 1/1987 | Summers | E21B 21/063 | 209/156 |
| 4,707,277 A * | 11/1987 | Mims | B01D 21/245 | 210/241 |
| 4,774,007 A * | 9/1988 | Gordon | B01D 17/00 | 210/766 |
| 4,818,419 A * | 4/1989 | Mims | B01D 21/0006 | 134/10 |
| 4,919,570 A * | 4/1990 | Payne | B09C 1/00 | 134/120 |
| 4,935,984 A * | 6/1990 | Bryant | E03F 7/10 | 134/167 C |
| 4,944,868 A * | 7/1990 | Jay, Sr. | B29B 17/02 | 209/10 |
| 4,954,267 A * | 9/1990 | Uremovich | B01D 37/02 | 208/177 |
| 5,093,008 A * | 3/1992 | Clifford, III | C02F 1/385 | 175/66 |
| 5,164,158 A * | 11/1992 | Brashears | B09C 1/06 | 422/1 |
| 5,167,841 A * | 12/1992 | Mims | B01D 21/245 | 210/241 |
| 5,199,997 A * | 4/1993 | Stowe | B01D 11/0226 | 134/25.1 |
| 5,203,614 A * | 4/1993 | Robbins | E21D 9/06 | 299/1.9 |
| 5,236,605 A * | 8/1993 | Warncke | B01D 17/00 | 210/799 |
| 5,244,308 A * | 9/1993 | Mims | B08B 9/0933 | 134/25.1 |
| 5,294,065 A * | 3/1994 | Harms | B28C 9/04 | 241/101.76 |
| 5,312,551 A * | 5/1994 | Perron | C02F 1/385 | 210/195.1 |
| 5,344,570 A * | 9/1994 | McLachlan | E21B 21/065 | 175/206 |
| 5,361,998 A * | 11/1994 | Sirevag | B09B 1/008 | 241/79.1 |
| 5,425,188 A * | 6/1995 | Rinker | B01D 45/06 | 175/206 |
| 5,439,597 A * | 8/1995 | Allen | B03B 9/02 | 134/25.1 |
| 5,454,957 A * | 10/1995 | Roff, Jr. | B01F 7/0065 | 210/768 |
| 5,570,749 A * | 11/1996 | Reed | E21B 21/066 | 175/206 |
| 5,662,807 A * | 9/1997 | Angelle | B01D 21/0096 | 210/744 |
| 5,671,762 A * | 9/1997 | Hancock, Jr. | B03B 5/00 | 134/104.3 |
| 5,770,094 A * | 6/1998 | Garton | B01D 29/6415 | 210/791 |
| 5,811,016 A * | 9/1998 | Zierler | B01D 21/0018 | 210/772 |
| 5,853,583 A * | 12/1998 | Shah | B01D 33/0346 | 210/340 |
| 5,900,137 A * | 5/1999 | Homan | B01D 17/005 | 210/85 |
| 5,928,519 A * | 7/1999 | Homan | B01D 17/005 | 210/741 |
| 6,059,977 A * | 5/2000 | Rowney | B01D 21/0042 | 175/66 |
| 6,096,201 A * | 8/2000 | Bruke | B01D 21/0039 | 210/155 |
| 6,106,733 A * | 8/2000 | Wood | E21B 21/066 | 210/774 |
| 6,193,070 B1 * | 2/2001 | Rowney | B01D 21/0042 | 209/208 |
| 6,214,092 B1 * | 4/2001 | Odom | B01D 19/0042 | 210/188 |
| 6,241,902 B1 * | 6/2001 | Huebner | B01D 29/23 | 210/781 |
| 6,390,006 B1 * | 5/2002 | Sridhar | B63B 25/02 | 114/73 |
| 6,391,195 B1 * | 5/2002 | Layton | B01D 21/01 | 210/195.1 |
| 6,395,187 B1 * | 5/2002 | Alanis | B01D 29/58 | 210/758 |
| 6,451,213 B2 * | 9/2002 | Huebner | B01D 29/23 | 210/770 |
| 6,461,523 B1 * | 10/2002 | Greenrose | B01D 29/6476 | 210/770 |
| 6,505,743 B1 * | 1/2003 | Bandis | B01D 21/00 | 209/173 |
| 6,506,310 B2 * | 1/2003 | Kulbeth | B01D 21/0018 | 175/206 |
| 6,530,438 B1 * | 3/2003 | McIntyre | B07B 1/06 | 175/66 |
| 6,533,946 B2 * | 3/2003 | Pullman | B01D 21/0012 | 210/787 |
| 6,553,901 B2 * | 4/2003 | Reddoch | B30B 9/12 | 100/106 |
| 6,681,874 B2 * | 1/2004 | Risher | E21B 21/065 | 175/206 |
| 6,808,354 B1 * | 10/2004 | Kulbeth | B65G 33/10 | 198/550.1 |
| 6,808,626 B2 * | 10/2004 | Kulbeth | B01D 21/0018 | 175/206 |
| 6,904,919 B2 * | 6/2005 | Taylor-Smith | B01D 11/0226 | 134/25.1 |

(56) References Cited

U.S. PATENT DOCUMENTS

| | | | | |
|---|---|---|---|---|
| 6,976,819 B2* | 12/2005 | Kulbeth | ................. | B65G 33/10 |
| | | | | 198/550.1 |
| 7,074,339 B1* | 7/2006 | Mims | ................. | B01D 21/0018 |
| | | | | 210/788 |
| 7,093,678 B2* | 8/2006 | Risher | ................. | E21B 21/065 |
| | | | | 175/206 |
| 7,118,631 B2* | 10/2006 | Philips | ................ | B01D 11/0226 |
| | | | | 134/1 |
| 7,135,107 B2* | 11/2006 | Palmer | ............... | B01D 21/0045 |
| | | | | 210/104 |
| 7,160,474 B2* | 1/2007 | Harding | ............ | B01D 21/0003 |
| | | | | 210/519 |
| 7,207,399 B2* | 4/2007 | Duhe | ...................... | C02F 1/20 |
| | | | | 175/66 |
| 7,306,057 B2* | 12/2007 | Strong | ................ | B01D 17/0211 |
| | | | | 175/66 |
| 7,335,311 B2* | 2/2008 | Christophersson | ..... | B30B 9/125 |
| | | | | 210/739 |
| 7,344,637 B2* | 3/2008 | Frommann | .............. | E03F 5/14 |
| | | | | 210/158 |
| 7,410,568 B2* | 8/2008 | Christopherson | ....... | B30B 9/163 |
| | | | | 210/97 |
| 7,431,846 B2* | 10/2008 | Palmer | ............... | B01D 21/0045 |
| | | | | 175/66 |
| 7,476,318 B1* | 1/2009 | Tibban | ................ | B01D 21/003 |
| | | | | 175/66 |
| 7,503,134 B2* | 3/2009 | Buckner | ............. | E01H 1/0827 |
| | | | | 15/300.1 |
| 7,510,661 B2* | 3/2009 | Hills | ........................ | C02F 1/38 |
| | | | | 210/173 |
| 7,514,011 B2* | 4/2009 | Kulbeth | .............. | B01D 21/267 |
| | | | | 210/780 |
| 7,544,302 B2* | 6/2009 | Harding | ................ | E21B 21/065 |
| | | | | 210/519 |
| 7,572,370 B2* | 8/2009 | Branner | ............. | B01D 21/2461 |
| | | | | 210/220 |
| 7,727,389 B1* | 6/2010 | Mallonee | ................ | B09C 1/00 |
| | | | | 210/182 |
| 7,731,840 B1* | 6/2010 | Mallonee | ................ | B09C 1/00 |
| | | | | 210/143 |
| 7,897,050 B2* | 3/2011 | Waibel | ................ | B01D 11/028 |
| | | | | 210/634 |
| 8,017,021 B1* | 9/2011 | Staples | .............. | B02C 18/0092 |
| | | | | 210/773 |
| 8,133,164 B2* | 3/2012 | Beebe | ................ | E21B 21/065 |
| | | | | 210/200 |
| 8,137,550 B1* | 3/2012 | Moe | ........................ | C02F 1/56 |
| | | | | 175/206 |
| 8,137,567 B1* | 3/2012 | Moe | ........................ | C02F 1/56 |
| | | | | 210/725 |
| 8,216,459 B2* | 7/2012 | Mallonee | ................ | B09C 1/06 |
| | | | | 210/182 |
| 8,316,557 B2* | 11/2012 | Burnett | ................ | E21B 21/066 |
| | | | | 34/314 |
| 8,377,301 B2* | 2/2013 | Miller | ................ | B01D 21/2461 |
| | | | | 210/298 |
| 8,388,850 B2* | 3/2013 | Delano | ..................... | C02F 9/00 |
| | | | | 210/748.01 |
| 8,449,779 B2* | 5/2013 | Thompson | ............ | E21B 21/065 |
| | | | | 198/671 |
| 8,517,167 B2* | 8/2013 | Thompson | ............ | B65G 33/14 |
| | | | | 198/658 |
| 8,528,665 B2* | 9/2013 | Jackson | ................ | E21B 21/065 |
| | | | | 175/206 |
| 8,556,083 B2* | 10/2013 | Burnett | ................ | B01D 33/0376 |
| | | | | 209/315 |
| 8,695,809 B2* | 4/2014 | Sherwood | ................ | E21B 21/01 |
| | | | | 210/384 |
| 8,715,498 B2* | 5/2014 | Bly, Jr. | ..................... | C02F 1/38 |
| | | | | 210/194 |
| 8,820,438 B2* | 9/2014 | Ross | ..................... | E21B 21/065 |
| | | | | 175/66 |
| 8,834,726 B2* | 9/2014 | Keister | ..................... | C01B 5/00 |
| | | | | 210/726 |
| 9,073,104 B2* | 7/2015 | Burnett | ................ | B09C 1/06 |
| 9,296,953 B2* | 3/2016 | Newman | ................ | B03D 1/10 |
| 9,358,484 B2* | 6/2016 | Tange | .................... | B01D 29/54 |
| 9,371,707 B1* | 6/2016 | Warncke | ............ | B01D 21/2405 |
| 9,409,184 B1* | 8/2016 | Mickelson | ............... | B03B 9/00 |
| 9,447,646 B1* | 9/2016 | Beason | ................ | B01F 13/1033 |
| 9,498,739 B2* | 11/2016 | Thompson | ......... | B01D 21/2494 |
| 9,500,052 B2* | 11/2016 | Ross | ..................... | E21B 21/068 |
| 9,561,978 B2* | 2/2017 | Theodoulou | .......... | B01D 29/35 |
| 9,574,413 B1* | 2/2017 | Farquhar | ................ | C02F 11/008 |
| 9,597,614 B2* | 3/2017 | Thompson | ......... | E21B 21/063 |
| 9,687,761 B2* | 6/2017 | Thompson | ........... | B01D 21/283 |
| 9,828,553 B2* | 11/2017 | Wheeler | ................ | C10G 1/02 |
| 10,124,345 B2* | 11/2018 | Nelson | ................... | B03B 7/00 |
| 10,150,062 B2* | 12/2018 | Dawson | ................ | C02F 11/14 |
| 10,155,181 B2* | 12/2018 | Dawson | ................ | B60P 3/2245 |
| 10,184,300 B2* | 1/2019 | Stegemoeller | ............ | E21B 7/02 |
| 10,238,994 B2* | 3/2019 | Ross | ..................... | B01D 21/262 |
| 10,328,364 B2* | 6/2019 | Ross | ..................... | B01D 21/283 |
| 10,337,167 B2* | 7/2019 | Maybury, Jr. | ............. | E02F 7/00 |
| 10,351,454 B2* | 7/2019 | Nelson | ..................... | B03B 7/00 |
| 10,399,029 B1* | 9/2019 | Hiracheta | ............... | B01D 17/00 |
| 10,449,470 B1* | 10/2019 | Freeman | ............ | B01D 17/0214 |
| 10,563,375 B2* | 2/2020 | Maybury | ................. | B60P 3/22 |
| 10,655,300 B2* | 5/2020 | Hofland | ............ | E02F 3/8891 |
| 10,722,919 B2* | 7/2020 | Beach | .................... | B07B 1/005 |
| 10,731,428 B2* | 8/2020 | Ross | ..................... | E21B 21/066 |
| 10,751,654 B1* | 8/2020 | Kulbeth | ................ | B01D 17/0214 |
| 10,773,188 B1* | 9/2020 | Kulbeth | ................ | B01D 21/2461 |
| 2002/0033278 A1* | 3/2002 | Reddoch | ............... | E21B 21/066 |
| | | | | 175/57 |
| 2002/0121475 A1* | 9/2002 | DeGarmo | ............ | F26B 17/107 |
| | | | | 210/512.1 |
| 2002/0162807 A1* | 11/2002 | Kulbeth | ................ | B01D 21/0018 |
| | | | | 210/804 |
| 2003/0029806 A1* | 2/2003 | Dickson | ............. | B01D 21/0012 |
| | | | | 210/747.4 |
| 2003/0062325 A1* | 4/2003 | Kulbeth | ................ | B01D 21/0018 |
| | | | | 210/804 |
| 2003/0136747 A1* | 7/2003 | Wood | ........................ | B09C 1/06 |
| | | | | 210/774 |
| 2004/0194354 A1* | 10/2004 | Haugen | ................... | E01B 27/10 |
| | | | | 37/317 |
| 2004/0208732 A1* | 10/2004 | Kulbeth | ................ | B65G 33/10 |
| | | | | 414/326 |
| 2005/0040119 A1* | 2/2005 | Kulbeth | ................ | B01D 21/267 |
| | | | | 210/806 |
| 2005/0042064 A1* | 2/2005 | Kulbeth | ................ | B65G 33/10 |
| | | | | 414/319 |
| 2005/0194322 A1* | 9/2005 | Palmer | ................ | B01D 21/2444 |
| | | | | 210/715 |
| 2005/0210623 A1* | 9/2005 | Buckner | ............... | E01H 1/0827 |
| | | | | 15/340.1 |
| 2005/0247647 A1* | 11/2005 | Hills | ........................ | C02F 1/38 |
| | | | | 210/787 |
| 2005/0279715 A1* | 12/2005 | Strong | ................ | E21B 21/066 |
| | | | | 210/774 |
| 2006/0032012 A1* | 2/2006 | Buckner | ............... | E21B 21/066 |
| | | | | 15/315 |
| 2006/0032095 A1* | 2/2006 | Buckner | ............... | E02F 3/9262 |
| | | | | 37/304 |
| 2007/0075024 A1* | 4/2007 | Campbell | ............ | B01D 21/02 |
| | | | | 210/802 |
| 2007/0246431 A1* | 10/2007 | Palmer | ................ | B01D 21/2444 |
| | | | | 210/715 |
| 2008/0283301 A1* | 11/2008 | Sherwood | ................ | E21B 21/01 |
| | | | | 175/206 |
| 2009/0250407 A1* | 10/2009 | Delano | ................ | B01F 3/04737 |
| | | | | 210/748.12 |
| 2009/0308602 A1* | 12/2009 | Bruins | ................. | E21B 21/062 |
| | | | | 166/250.01 |
| 2011/0068063 A1* | 3/2011 | Mallonee | ................ | B09C 1/06 |
| | | | | 210/770 |
| 2011/0215058 A1* | 9/2011 | Thompson | ............ | E21B 21/065 |
| | | | | 210/787 |

(56) References Cited

U.S. PATENT DOCUMENTS

| | | | |
|---|---|---|---|
| 2012/0285873 A1* | 11/2012 | Brenan | B01D 43/00 210/150 |
| 2012/0292257 A1* | 11/2012 | Hartley | B65G 41/002 210/709 |
| 2012/0312755 A1* | 12/2012 | Ryan | B01D 21/01 210/749 |
| 2013/0037455 A1* | 2/2013 | Irwin | B07B 1/28 209/257 |
| 2013/0043195 A1* | 2/2013 | O'Konek | C02F 1/385 210/749 |
| 2013/0048575 A1* | 2/2013 | Gruber | C02F 1/24 210/749 |
| 2013/0068587 A1* | 3/2013 | Wheeler | C10B 1/10 196/98 |
| 2013/0099404 A1* | 4/2013 | Lang | C01B 17/0216 264/6 |
| 2013/0186622 A1* | 7/2013 | Thompson | E21B 43/34 166/267 |
| 2013/0200007 A1* | 8/2013 | O'Konek | C02F 9/00 210/749 |
| 2014/0021137 A1* | 1/2014 | Smiddy | C02F 9/005 210/663 |
| 2014/0083912 A1* | 3/2014 | DeFino | B09B 3/0083 209/3.1 |
| 2014/0099177 A1* | 4/2014 | Steinke | B65D 88/546 414/293 |
| 2014/0175008 A1* | 6/2014 | Mathis | E21B 21/066 210/602 |
| 2014/0190904 A1* | 7/2014 | Sewell | E21B 21/066 210/768 |
| 2014/0217631 A1* | 8/2014 | Lang | C01B 17/0237 264/13 |
| 2014/0262735 A1* | 9/2014 | Hawks | C02F 9/00 203/10 |
| 2015/0001161 A1* | 1/2015 | Wiemers | C02F 1/56 210/739 |
| 2015/0060369 A1* | 3/2015 | Richie | C02F 1/5281 210/723 |
| 2015/0218020 A1* | 8/2015 | Miller | C02F 1/5236 210/724 |
| 2015/0251108 A1* | 9/2015 | Hartley | B09B 3/0025 210/749 |
| 2015/0368564 A1* | 12/2015 | Wheeler | C10B 55/04 202/83 |
| 2015/0368567 A1* | 12/2015 | Wheeler | C10G 1/02 201/2.5 |
| 2016/0053184 A1* | 2/2016 | Wheeler | B01D 3/346 585/241 |
| 2016/0096124 A1* | 4/2016 | Marco | B01D 29/23 210/170.01 |
| 2016/0097247 A1* | 4/2016 | Marco | B01D 29/688 166/308.1 |
| 2016/0107902 A1* | 4/2016 | Smiddy | C02F 9/00 210/665 |
| 2016/0115062 A1* | 4/2016 | Krieger | C02F 9/00 210/241 |
| 2016/0115065 A1* | 4/2016 | Yamashita | C02F 11/14 210/767 |
| 2016/0229728 A1* | 8/2016 | McPherson | C02F 11/121 |
| 2016/0256799 A1* | 9/2016 | Thompson | B01D 21/283 |
| 2017/0023247 A1* | 1/2017 | Gross | F23G 5/165 |
| 2017/0029289 A1* | 2/2017 | Munisteri | B01D 21/0009 |
| 2017/0057393 A1* | 3/2017 | Steger | B60P 1/165 |
| 2017/0087487 A1* | 3/2017 | Sharpe | E21B 21/065 |
| 2017/0120796 A1* | 5/2017 | Scott | B60P 3/24 |
| 2017/0145802 A1* | 5/2017 | Thompson | B01D 21/2494 |
| 2017/0225992 A1* | 8/2017 | Duesel, Jr. | B01D 1/223 |
| 2017/0233262 A1* | 8/2017 | Duesel, Jr. | E21B 43/26 210/179 |
| 2017/0252674 A1* | 9/2017 | Thompson | B65G 33/10 |
| 2017/0305766 A1* | 10/2017 | Richie | B01D 21/003 |
| 2018/0079347 A1* | 3/2018 | Ellis | B60P 1/6454 |
| 2018/0086245 A1* | 3/2018 | Heck | B60P 1/286 |
| 2018/0087237 A1* | 3/2018 | Rajewski | E02F 3/90 |
| 2018/0117503 A1* | 5/2018 | Ross | B01D 21/0045 |
| 2018/0126306 A1* | 5/2018 | Wade | B01D 29/902 |
| 2018/0126894 A1* | 5/2018 | Ross | B60P 3/2205 |
| 2018/0141827 A1* | 5/2018 | Hawks | C02F 1/281 |
| 2018/0193773 A1* | 7/2018 | Thompson | E21B 43/34 |
| 2018/0193775 A1* | 7/2018 | Ross | E21B 21/068 |
| 2018/0200759 A1* | 7/2018 | Beach | B07B 1/005 |
| 2018/0250612 A1* | 9/2018 | Dawson | B60P 1/26 |
| 2018/0290094 A1* | 10/2018 | Chandran | C10G 2/34 |
| 2019/0060794 A1* | 2/2019 | Droke | B01D 21/2472 |
| 2019/0070526 A1* | 3/2019 | Dawson | C02F 11/121 |
| 2019/0076895 A1* | 3/2019 | Estep | B09C 1/02 |
| 2019/0084847 A1* | 3/2019 | Richie | B01D 21/003 |
| 2019/0143380 A1* | 5/2019 | Davis | B65G 45/005 134/65 |
| 2019/0271200 A1* | 9/2019 | Coates | B01D 17/02 |
| 2019/0291025 A1* | 9/2019 | Simoneau | B01D 21/0042 |
| 2020/0032478 A1* | 1/2020 | Rajewski | E02F 9/20 |
| 2020/0071194 A1* | 3/2020 | Hawks | B01D 15/10 |
| 2020/0101403 A1* | 4/2020 | Bollom | B01D 53/18 |
| 2020/0130016 A1* | 4/2020 | DeFino | B07B 1/00 |
| 2020/0140309 A1* | 5/2020 | McPherson | F26B 5/041 |
| 2020/0149380 A1* | 5/2020 | Procita | E21B 43/2607 |

* cited by examiner

TRANSPORTABLE SEPARATION AND MONITORING APPARATUS WITH AUGER

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to a single, transportable separation and monitoring apparatus for efficiently separating spent materials recovered from oil and gas wells.

2. Description of the Related Art

Spent materials are generated at essentially all oil and gas well sites. Spent materials are typically comprised of solids, liquids and gases. In typical oil and gas operations many separate pieces of equipment are brought in to be able to separate spent materials into the various solid, liquid and gaseous components.

Accordingly, there is a need for a single and transportable apparatus that can separate spent materials into the separate solid, liquid and gaseous components.

SUMMARY OF THE INVENTION

The present disclosure is directed toward a transportable separation apparatus for separating spent materials from oil and gas operations into a primarily solid component and a primarily liquid component. The transportable separation apparatus having a first separation area disposed on the transportable separation apparatus for receiving spent materials and beginning separation of the spent materials. The transportable separation apparatus designed to be connected to a vehicle to be pulled on commercial roadways. The transportable separation apparatus also includes a second separation area in fluid communication with the first separation area for further separation of the spent materials. The separation apparatus can further include an auger in fluid communication with the first separation area to remove the primarily solid component from the transportable separation apparatus.

The present disclosure is also directed towards a method for separating spent materials recovered from oil and gas wells. The method includes introducing spent materials recovered from an oil and gas well to the transportable separation apparatus described herein for separating the spent materials from oil and gas operations into a primarily solid component and a primarily liquid component. The method further includes separating the spent materials into a primarily liquid component and a primarily solid component.

DETAILED DESCRIPTION OF THE DISCLOSURE

Figure 1:
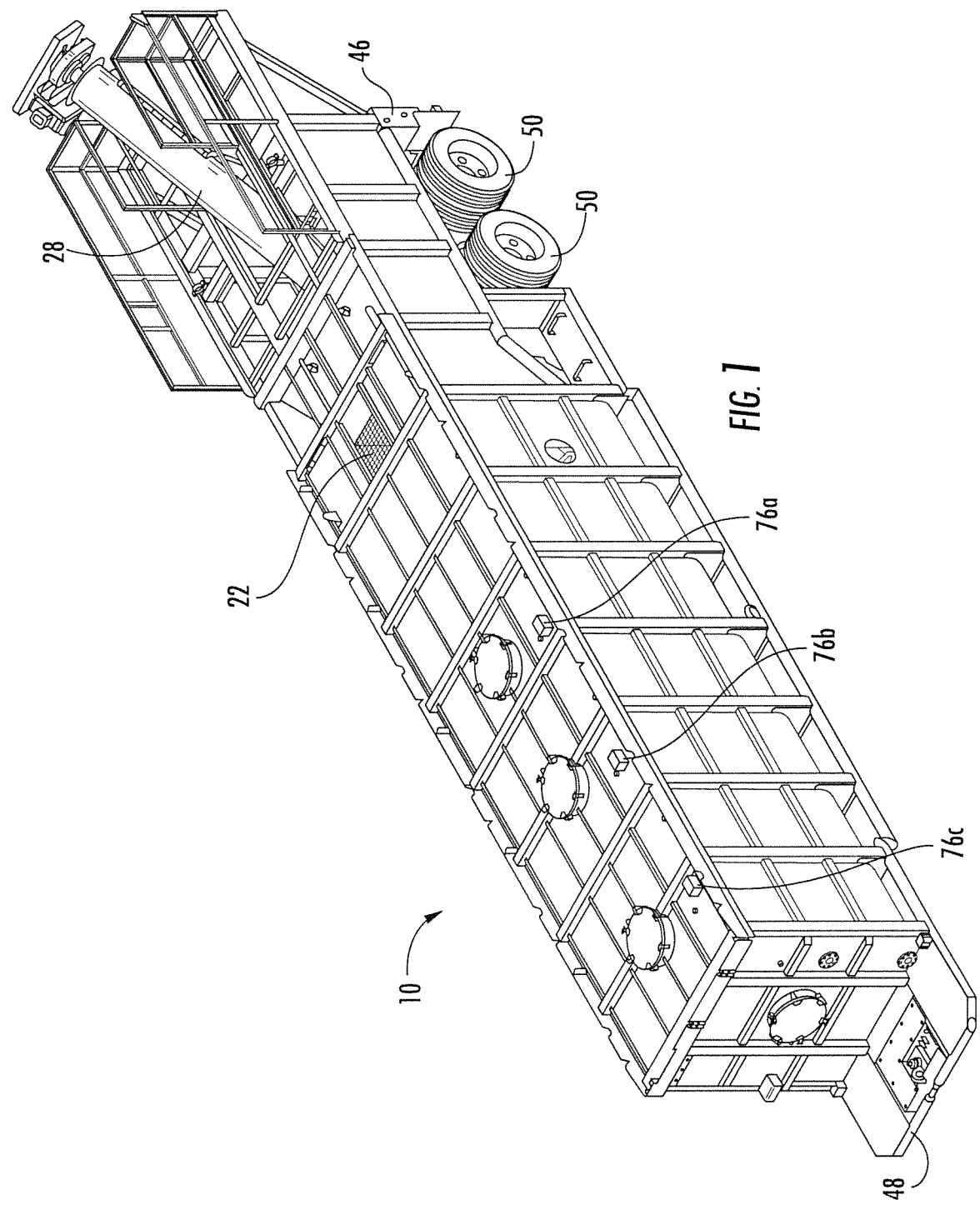
FIG. 1 is a perspective view of a separation and monitoring apparatus constructed in accordance with the present disclosure.
Figure 2:
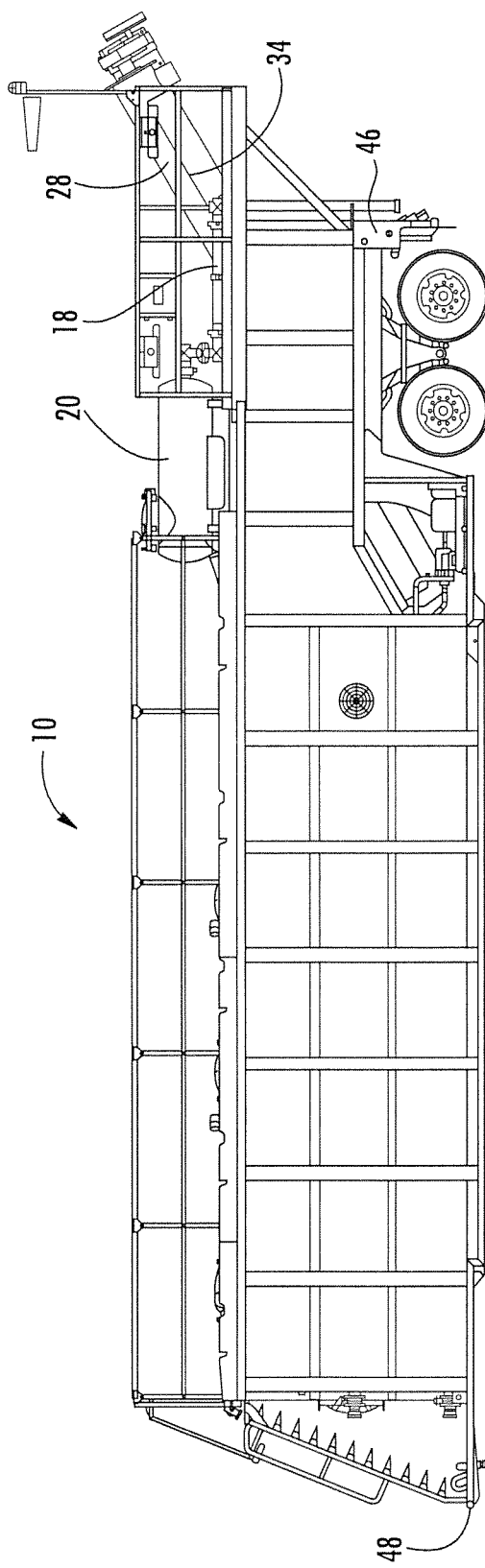
FIG. 2 is a side elevation view of the separation and monitoring apparatus constructed in accordance with the present disclosure.
Figure 3:
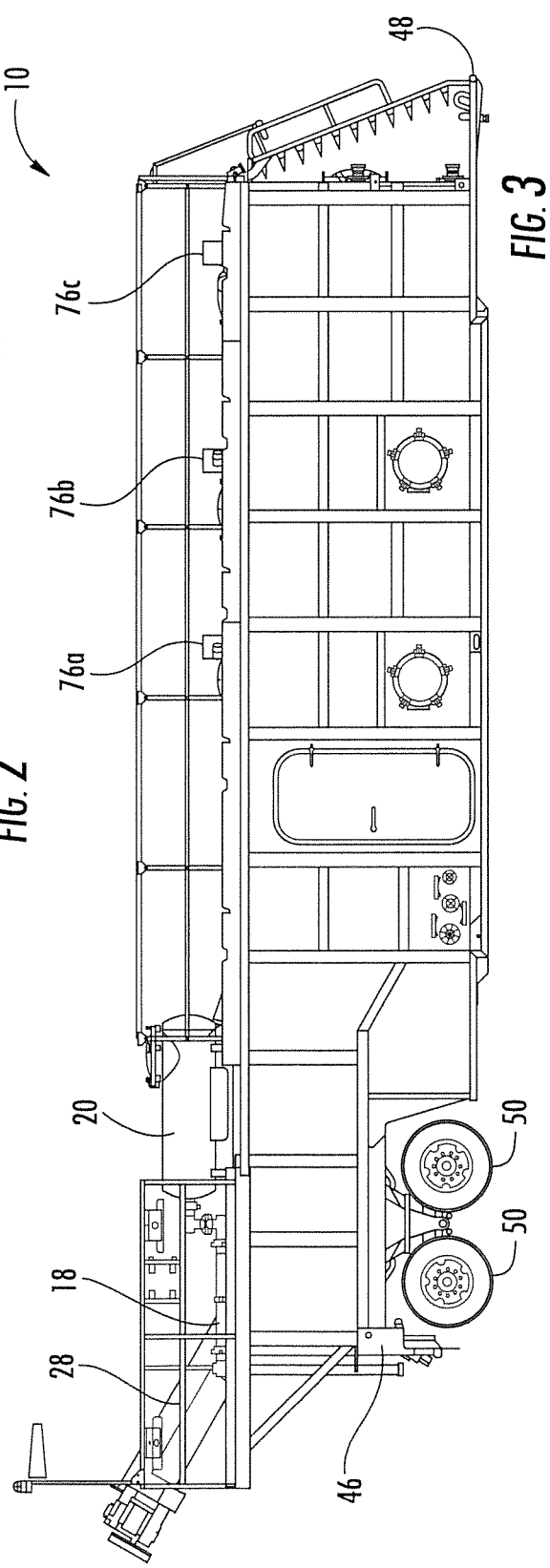
FIG. 3 is a side elevation view of the separation and monitoring apparatus constructed in accordance with the present disclosure.
Figure 4:
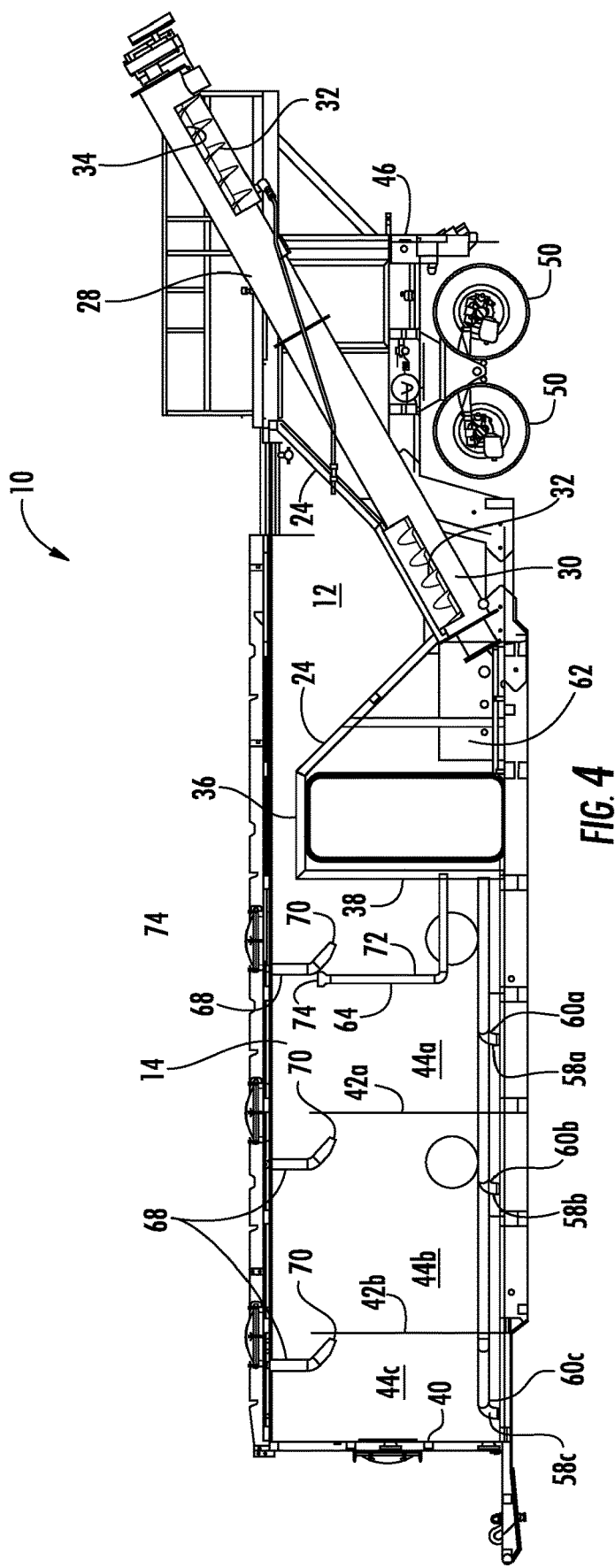
FIG. 4 is a cross-sectional view of the separation and monitoring apparatus constructed in accordance with the present disclosure.
Figure 5:
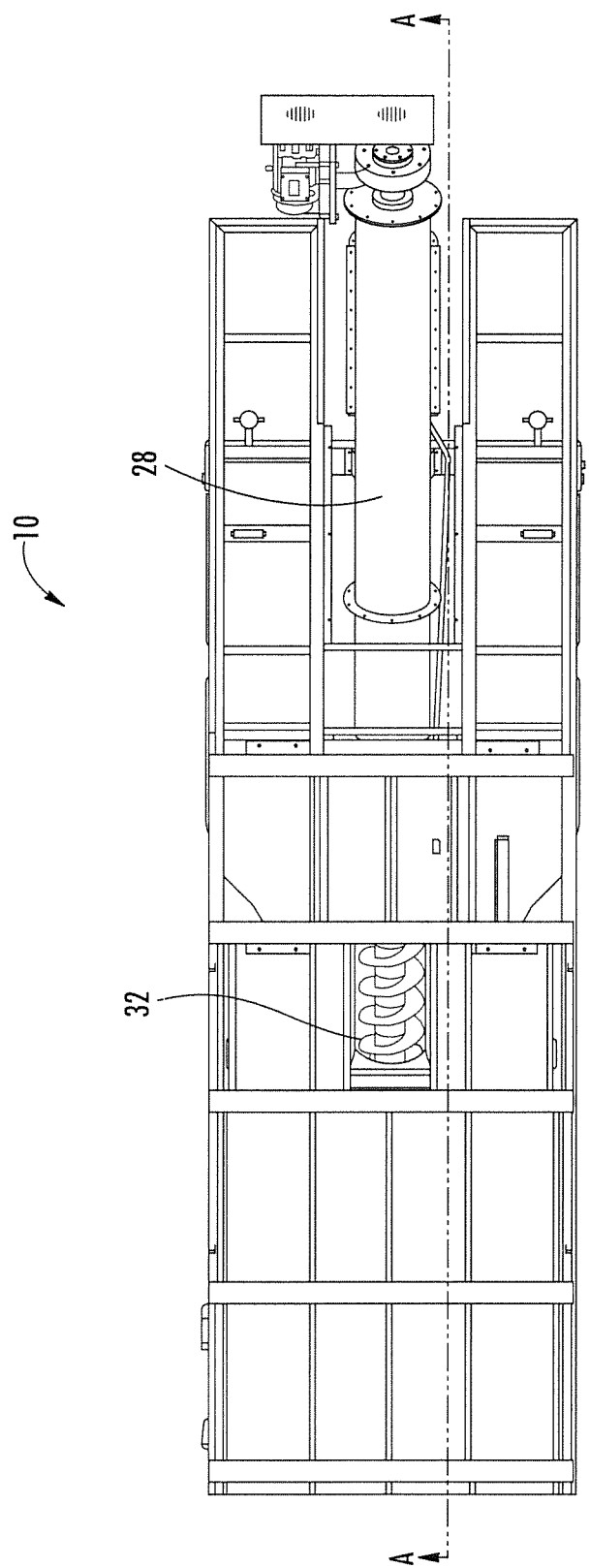
FIG. 5 is a top plan view of a portion of the separation and monitoring apparatus constructed in accordance with the present disclosure.

The present disclosure relates to a single, transportable separation and monitoring apparatus 10 for efficiently separating spent materials recovered from oil and gas wells. The spent materials recovered from oil and gas wells can be comprised of a solid component, a liquid component and a gaseous component. The separation and monitoring apparatus 10 described herein can be supported and incorporated into a single transportable apparatus, such as a trailer with wheels and an attachment apparatus for connecting to a vehicle to be pulled or towed on commercial roadways. In another embodiment, the separation and monitoring apparatus 10 can be mounted on a skid that can be loaded and unloaded from a trailer with wheels.

As shown in FIGS. 1-6, the separation and monitoring apparatus 10 includes a first separation area 12 for receiving and beginning separation of the spent materials and a second separation area 14 for further separation of the spent materials. The first separation area 12 receives the spent materials via a materials inlet 16. The spent materials can be provided to the materials inlet 16 via conduit(s) or piping 18. In one embodiment, the spent materials are provided to an air removal apparatus 20 to remove the gaseous component from the spent materials before passing through the materials inlet 16 and into the first separation area 12. The separation and monitoring apparatus 10 can also include a screen 22 disposed between the piping 18 and the first separation area 12 to remove debris that is over a certain size.

The first separation area 12 includes angled portions 24 that direct spent materials flowing into the first separation area 12 via the materials inlet 16 toward a lower opening 26 of an auger housing 28. The spent materials flowing into the first separation area 12 primarily consists of the liquid component and the solid component. The solid component settles to the lower portion of the first separation area 12 and into a lower portion 30 of the auger housing 28. An auger 32 is disposed in the auger housing 28 and drives the solid component upward in the auger housing 28 while permitting the liquid component to remain in the lower part of the auger housing 28 and in the first separation area 12. The solid component is removed from the auger housing 28 via an upper opening 34 disposed therein. The primary component of the solid component being removed by the auger 32 is sand. In one embodiment, the auger 32 and auger housing 28 are angled upwards out and away from the first separation area 12.

At a certain depth in the first separation area 12, the liquid component of the spent materials, which is typically less dense than the solid component, will rise above a spillway 36 and flow into the second separation area 14. The liquid component is primarily comprised of an oil portion and an aqueous portion. The second separation area 14 includes a first end 38 disposed adjacent to the first separation area 12 and/or the spillway 36, a second end 40 disposed on the opposite end of the second separation area 14, and weir elements 42 to separate the liquid component into the oil portion and the aqueous portion. The second separation area 14 can have multiple separation zones 44, which are created between the ends 38 and 40 and the weir elements 42 and between the weir elements 42 themselves.

In an exemplary embodiment, the liquid component flows over the spillway 36 and into a first separation zone 44a disposed between the first end 38 of the second separation area 14 and a first weir element 42a. The aqueous portion of the liquid component of the spent materials is denser than the oil portion and settles lower in the first separation zone 44a. Consequently, the oil portion settles above the aqueous portion and will eventually spill over the first weir element 42a into a second separation zone 44b when a sufficient amount of the liquid component enters the first separation zone 44a. The second separation zone 44b is defined as the area between the first weir element 42a and a second weir element 42b.

The oil portion entering the second separation zone 44b can still include some amount of an aqueous component and can be further separated into a second oil portion and a second aqueous portion. The second oil portion settles atop the second aqueous portion and the second oil portion can spill over into a third separation zone 44c wherein even further separation can occur whereby a third oil portion and a third aqueous portion are created. The third oil portion settles atop the third aqueous portion. The aqueous portion, the second aqueous portion and the third aqueous portion can be withdrawn from the first separation zone 44a, the second separation zone 44b and the third separation zone 44c of the second separation area 14, respectively. It should be understood and appreciated that the second separation area 14 can include as many separation zones 44 and weir elements 42 desirable to achieve the desired separation no oil and aqueous part of the liquid component.

One end of the separation and monitoring apparatus 10 can be a wheeled end 46 and the other end of the separation and monitoring apparatus 10 is a hitch end 48. The wheel end 46 includes a plurality of wheels 50 to facilitate transportation of the apparatus 10 on roadways. The hitch end 48 is the end of the separation and monitoring apparatus 10 that is attachable to a vehicle for transporting the separation and monitoring apparatus 10. In one embodiment, the auger 32 and the first separation area 12 are positioned adjacent to the wheeled end 46 of the separation and monitoring apparatus 10 and the second separation area 14 is positioned adjacent to the hitch end 48 of the separation and monitoring apparatus 10.

Figure 6:
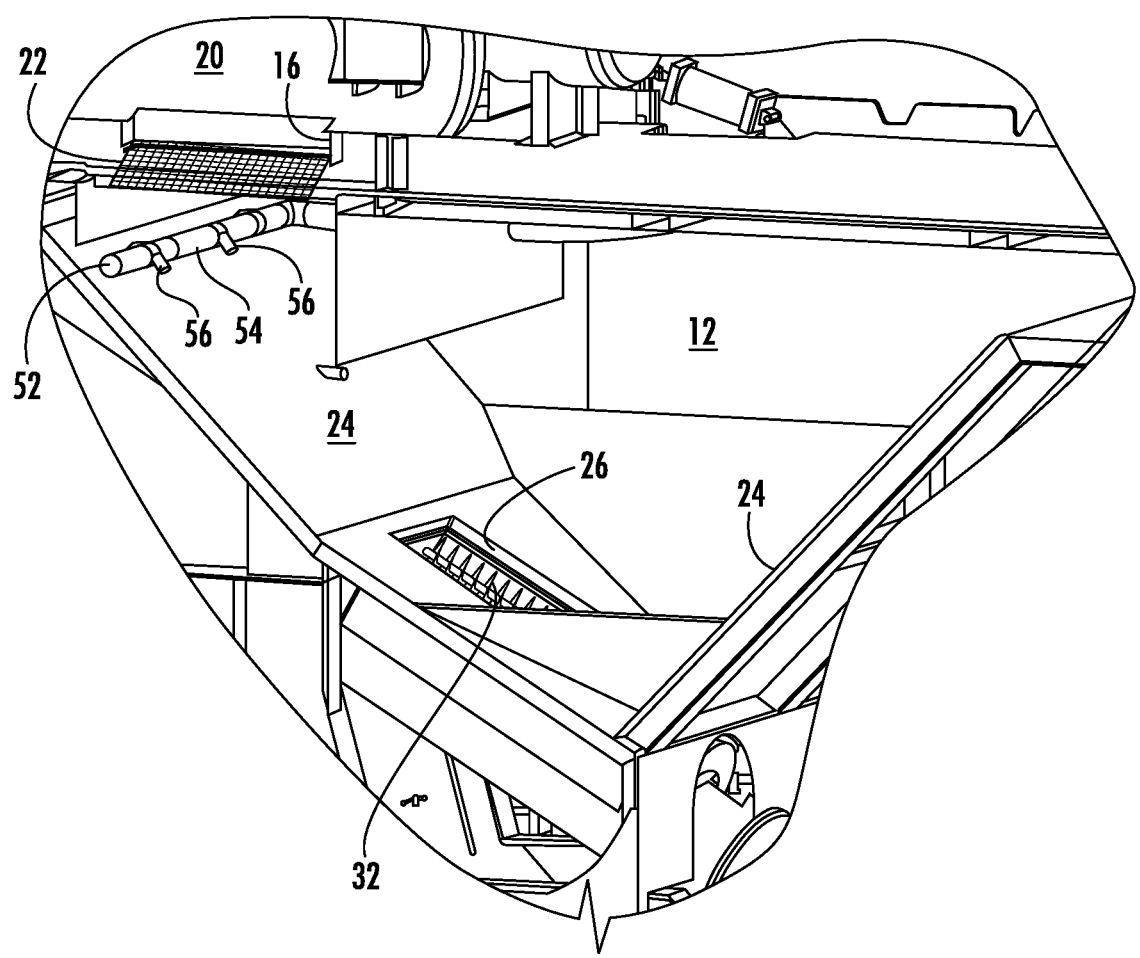
FIG. 6 is a perspective view of a portion of the separation and monitoring apparatus constructed in accordance with the present disclosure.

In one embodiment shown in FIG. 6, the separation and monitoring apparatus 10 includes a jet apparatus 52 to direct a high velocity fluid onto the angled portion 24 of the first separation area 12 that is disposed below the materials inlet 16. The solid component of the spent materials may accumulate on the angled portion 24 of the first separation area 12 and the high velocity fluid from the jet apparatus 52 will force the solid component in the first separation area 12 toward the lower opening 26 disposed in the auger housing 28. The jet apparatus 52 can have fluid provided to it via piping 54 and include at least one jet (or nozzle) 56 disposed on and in fluid communication with the piping 54. It should be understood and appreciated that the jet apparatus 54 can be equipped with any necessary support elements to force fluid through the piping 54 and jets 56, such as pumps, a fluid source, additional piping, etc.

In yet another embodiment of the present disclosure, the separation and monitoring apparatus 10 includes water outlets 58a, 58b and 58c in fluid communication with the first, second and third separation zones 44a, 44b and 44c, respectively. The water outlets 58a, 58b and 58c can be conduits 60a, 60b and 60c that are in fluid communication with a pumping system 62 for withdrawing the aqueous portions from the first, second and third separation zones 44a, 44b and 44c. The aqueous portions removed from the separation zones 44 can be sent from the separation and monitoring apparatus 10 to various storage containers. In one embodiment, the water outlets 58a, 58b and 58c are disposed in the lower part of the separation zones 44 because of the aqueous portions being lower in the separation zones 44a, 44b and 44c. It should be understood that the pumping system 62 can be comprised of various components to facilitate its operation, such as pumps, piping, etc.

In yet another embodiment of the present disclosure, the separation and monitoring apparatus 10 includes a cleaning system 68 for cleaning the second separation area 14. The cleaning system 68 includes fluid outlets 70 for providing fluid under pressure to the separation zones 44 to flush out any fluid or debris in the separation zones 44. In one embodiment, the outlets 70 are disposed in an upper part of the separation zones 44 to allow flushing fluid to better affect the cleaning of the separation zones 44. The outlets 70 can be designed such that the flushing fluid is dispersed laterally upon exiting the outlets 70. Flushing fluid can be provided to the cleaning system 68 and outlets 70 via a pumping system. It should be understood and appreciated that the pumping system used for the cleaning system 68 can be the pumping system 62 or it can be a separate system and can include various components necessary to affect the operation of the cleaning system 68.

The separation and monitoring apparatus 10 can also include an oil outlet 64 disposed in the second separation area 14 to remove any of the oil portions from the second separation area 14. In one embodiment, the oil outlet 64 can be vertically disposed piping 72 having an opening 74 disposed at the top to allow the oil portion to be skimmed off the top. The oil outlet 64 can be disposed in any of the separation zones 44. In one embodiment, the oil outlet 64 can be disposed in the first separation zone 44a. The pump system 62 can incorporate any necessary components, such as pumps, piping, etc., to facilitate the removal of the oil portion from the separation and monitoring apparatus 10 and transport the oil portion to a storage container or tank.

In a further embodiment of the present disclosure, the separation and monitoring apparatus 10 can include fluid level measuring devices 76 for determining the level of the fluid in the second separation area 14. More specifically, the separation and monitoring apparatus 10 can include a fluid level measuring device 76a for determining the level of the fluid in the first separation zone 44a, a second fluid level measuring device 76b for determining the level of the fluid in the second separation zone 44b and a third fluid level measuring device 76c for determining the level of the fluid in the third separation zone 44c. The fluid level measuring device 76 can be any device known in the art for measuring the level of fluid. In one embodiment, the fluid level measuring device 76 can use sonar technology to determine the fluid level. The fluid level measuring device 76 can be disposed in any location on the separation and monitoring apparatus 10 such that the level of the fluid in the separation zones 44 can be determined. In one embodiment, the fluid level measuring devices 76 can be located in the top, at the top or even disposed through the top of the second separation area 14.

The pumping system 62 can include flow measuring devices (or multiple different components) to determine the amount of aqueous fluid being removed from the second separation area 14. The amount of aqueous fluid being removed from the second separation area 14 and the levels of fluid in the separation zones 44 determined by the fluid level measuring devices 76 can be used to determine the amount of aqueous fluid (or water) that has been removed from a well in real-time. It should be understood and appreciated that any devices known in the art for measuring fluid flow can be used to determine the amount of aqueous fluid flowing out of the second separation area 14.

Another embodiment so the present disclosure is directed toward a method of using the separation and monitoring apparatus 10 to separate the spent drilling materials into separate components and to measure the amount of aqueous fluid (or water) removed from a well.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A transportable separation apparatus for separating spent materials from oil and gas operations into a primarily solid component and a primarily liquid component, the transportable separation apparatus comprising:
    a trailer having a first end including a hitch and a second wheeled end;
    a first separation chamber including at least one angled portion, said first separation chamber being disposed on said trailer for receiving said spent materials and beginning separation of the spent materials;
    a second separation chamber disposed on said trailer;
    a spillway disposed between, and placing said first separation chamber in fluid communication with said second separation chamber, such that primarily liquid will flow from said first separation chamber to said second separation chamber;
    an inlet for introducing said spent materials into said first separation chamber;
    an auger having a first end in fluid communication with a lower portion of said first separation chamber, and a second end extending beyond said wheeled end and to an elevation higher than said first separation chamber for removing the primarily solid component from the first separation chamber; and
    a jet apparatus to force the primarily solid component of the spent materials that has settled on the at least one angled portion in the first separation area toward the first end of said auger.

2. The transportable separation apparatus of claim 1 wherein said inlet further includes a gas removal apparatus for removing the primarily gaseous component from the spent materials prior to the spent materials entering the first separation chamber.

3. The transportable separation apparatus of claim 1 further comprising a screen disposed adjacent to the first separation chamber to remove large debris from the spent materials entering the first separation chamber.

4. The transportable separation apparatus of claim 1 further comprising a pumping system to remove an aqueous portion of the primarily liquid component of the spent materials from the second separation chamber.

5. The transportable separation apparatus of claim 1 further comprising fluid level measuring devices for determining fluid levels in separation zones in the second separation chamber.

6. The transportable separation apparatus of claim 5 wherein the fluid level measuring devices incorporate sonar to determine the fluid levels in the separation zones.

7. The transportable separation apparatus of claim 5 further comprising a cleaning system for directing fluid into the separation zones to clean the separation zones.

8. The transportable separation apparatus of claim 7 wherein the cleaning system includes fluid outlets for providing fluid under pressure to the separation zones to flush out any fluid or debris in the separation zones.

9. The transportable separation apparatus of claim 5 wherein weir elements separate the separation zones in the second separation chamber.

* * * * *